(12) United States Patent
Peng (10) Patent No.: US 10,999,784 B2
(45) Date of Patent: May 4, 2021

(54) METHOD FOR SMART DEVICE TO ACCESS NETWORK, MOBILE TERMINAL, CLOUD SERVER, DEVICE, AND SYSTEM (71) Applicant: YUN DING NETWORK TECHNOLOGY (BEIJING) CO., LTD., Beijing (CN)

(72) Inventor: Binghui Peng, Beijing (CN)

(73) Assignee: YUN DING NETWORK TECHNOLOGY (BEIJING) CO., LTD., Beijing (CN)

( * ) Notice: Subject to any disclaimer, the term of this patent is extended or adjusted under 35 U.S.C. 154(b) by 12 days.

(21) Appl. No.: 16/505,938

(22) Filed: Jul. 9, 2019

(65) Prior Publication Data

US 2020/0015153 A1 Jan. 9, 2020

Related U.S. Application Data

(63) Continuation of application No. PCT/CN2018/071919, filed on Jan. 9, 2018.

(30) Foreign Application Priority Data

Jan. 9, 2017 (CN) .......................... 201710014588.X (51) Int. Cl.
*H04W 48/16* (2009.01)
*H04W 76/10* (2018.01)
(Continued)

(52) U.S. Cl.
CPC .............. *H04W 48/16* (2013.01); *H04W 4/20* (2013.01); *H04W 8/005* (2013.01);
(Continued)

(58) Field of Classification Search
CPC ...... H04L 67/10; H04W 12/037; H04W 4/20; H04W 4/70; H04W 4/80; H04W 48/10;
(Continued)

(56) References Cited

U.S. PATENT DOCUMENTS

2015/0072653 A1* 3/2015 Fan ...................... H04L 12/2807
455/411

FOREIGN PATENT DOCUMENTS

| CN | 104777752 A | 7/2015 |
| CN | 106059837 A | 10/2016 |
| CN | 106878923 A | 6/2017 |

OTHER PUBLICATIONS

Office Action with Search Report including English translation issued in corresponding Chinese Application No. 201710014588.X, dated Aug. 28, 2019 (17 pages).

(Continued)

*Primary Examiner* — Zhensheng Zhang
(74) *Attorney, Agent, or Firm* — Osha Bergman Watanabe & Burton LLP (57) ABSTRACT

The present disclosure provides a network access method, a smart device, a mobile terminal, a cloud server, a networking gateway and a network access system. The method is applied to a smart device and includes: sending relevant network access information to a mobile terminal, the relevant network access information being uploaded to a cloud server by the mobile terminal; receiving a unique network identifier ID from the mobile terminal, and establishing a communication link with a networking gateway via the unique network identifier ID, wherein the unique network identifier ID is acquired by the cloud server from the networking gateway and transferred from the cloud server to the mobile terminal; and sending network access identity information to the networking gateway via the communication link, and joining a network created by the networking gateway after the network access identity information passes verification of the networking gateway.

10 Claims, 4 Drawing Sheets

(51) Int. Cl.
*H04W 4/20* (2018.01)
*H04W 8/00* (2009.01)
*H04W 48/10* (2009.01)
*H04W 48/14* (2009.01)
*H04W 12/037* (2021.01)

(52) U.S. Cl.
CPC ......... *H04W 12/037* (2021.01); *H04W 48/10* (2013.01); *H04W 48/14* (2013.01); *H04W 76/10* (2018.02)

(58) Field of Classification Search
CPC ..... H04W 48/14; H04W 48/16; H04W 48/18; H04W 76/10; H04W 8/005; H04W 88/04; Y02D 30/70
See application file for complete search history.

(56) References Cited

OTHER PUBLICATIONS

International Search Report issued in corresponding International Application No. PCT/CN2018/071919 dated Apr. 4, 2018 (2 pages).
Written Opinion issued in corresponding International Application No. PCT/CN2018/071919 dated Apr. 4, 2018 (4 pages).

\* cited by examiner

Fig. 7

METHOD FOR SMART DEVICE TO ACCESS NETWORK, MOBILE TERMINAL, CLOUD SERVER, DEVICE, AND SYSTEM The present application is a continuation application of International Application No. PCT/CN2018/071919, filed on Jan. 9, 2018, which claims a priority to Chinese Patent Application No. 201710014588.X, filed on Jan. 9, 2017, the disclosure of which is incorporated herein by reference.

FIELD

The present disclosure relates to network access technology field, and more particularly, to a network access method, a smart device, a mobile terminal, a cloud server, a networking gateway, and a network access system.

BACKGROUND

There are mainly two conventional methods for a low-power-consumption smart device to access a network. For method 1, configuration buttons of a new smart device and of a mobile phone application (APP) are pressed successively, such that the smart device continuously sends special broadcast packets through a Bluetooth slave device, and the mobile phone, as a Bluetooth master device, continuously scans. The smart device and the mobile phone find each other and communicate with each other by using Bluetooth communication as a medium. In this method, since currently the Bluetooth communication is point-to-point communication, the smart device cannot access a network successfully due to interference generated in a case where several new devices need to access the network simultaneously. Moreover, a real-time online communication cannot be achieved when the mobile phone is not around the smart device. For method 2, configuration buttons of the new smart device and the mobile phone APP are pressed successively, such that the mobile phone APP notifies a networking gateway via a cloud end, and the smart device searches for the gateway via ZigBee and requests to establish a communication link with the gateway. The smart device and the mobile phone find each other and communicate with each other by using ZigBee communication as a medium. With respect to this method, as the smart device performs search operation on all gateways nearby, when there are several gateways permitting access, the smart device needs to establish connection with and to verify validity of the several gateways one by one, and thus the network access speed is slow.

SUMMARY

In a first aspect, the present disclosure provides a network access method applied to a smart device to access a network, including:

sending relevant network access information to a mobile terminal, wherein the relevant network access information is uploaded to a cloud server by the mobile terminal;

receiving a unique network identifier ID from the mobile terminal, and establishing a communication link with a networking gateway via the unique network identifier ID, wherein the unique network identifier ID is acquired by the cloud server from the networking gateway and transferred from the cloud server to the mobile terminal after the cloud server sends the relevant network access information to the networking gateway; and sending network access identity information to the networking gateway via the communication link, and joining a network created by the networking gateway after the network access identity information passes verification of the networking gateway.

In a second aspect, the present disclosure provides another network access method applied to a mobile terminal, including:

receiving relevant network access information from a smart device to access a network, and uploading a device addition command carrying the relevant network access information to a cloud server, to enable the cloud server to obtain a unique network identifier ID from a networking gateway; and receiving the unique network identifier ID from the cloud server, and sending the unique network identifier ID to the smart device, to enable the smart device to establish a communication link with the networking gateway via the unique network identifier ID and to join a network created by the networking gateway via the communication link.

In a third aspect, the present disclosure provides another network access method applied to a cloud server, including:

receiving relevant network access information of a smart device to access a network, and sending a network access request carrying the relevant network access information to a networking gateway; and receiving a unique network identifier ID from the networking gateway, and sending the unique network identifier ID to the smart device via a mobile terminal, to enable the smart device to establish a communication link with the networking gateway via the unique network identifier ID and to join a network created by the networking gateway via the communication link.

In a fourth aspect, the present disclosure provides another network access method applied to a networking gateway, including:

receiving relevant network access information from a smart device to access a network, verifying the relevant network access information according to a preset rule, and when the verification is passed, sending a unique network identifier ID to the smart device via a cloud server and a mobile terminal, to enable the smart device to establish a communication link with the networking gateway via the unique network identifier ID; and receiving network access identity information from the smart device via the communication link, verifying the network access identity information, and when the verification is passed, adding the smart device to a network created by the networking gateway.

In a fifth aspect, the present disclosure provides a smart device, including a processor and a memory configured to store software modules executable by the processor. The processor is configured to run a program corresponding to the software module by reading the software modules stored in the memory. The software modules include:

a first sending module, configured to send relevant network access information to a mobile terminal, wherein the relevant network access information is uploaded by the mobile terminal to a cloud server;

a first receiving module, configured to receive a unique network identifier ID from the mobile terminal, wherein the unique network identifier ID is acquired by the cloud server from a networking gateway and transferred from the cloud server to the mobile terminal after the cloud server sends the relevant network access information to the networking gateway; and an establishing module, configured to establish a communication link with the networking gateway via the unique network identifier ID;

a second sending module, configured to send network access identity information to the networking gateway via the communication link; and a first joining module, configured to join a network created by the networking gateway after the network access identity information passes verification of the networking gateway.

In a sixth aspect, the present disclosure provides a mobile terminal, including a processor and a memory configured to store software modules executable by the processor. The processor is configured to run a program corresponding to the software module by reading the software modules stored in the memory. The software modules include:

a second receiving module, configured to receive relevant network access information from a smart device to access a network;

an uploading module, configured to upload a device addition command carrying the relevant network access information to a cloud server, to enable the cloud server to obtain a unique network identifier ID from a networking gateway;

a third receiving module, configured to receive the unique network identifier ID from the cloud server; and a third sending module, configured to send the unique network identifier ID to the smart device, to enable the smart device to establish a communication link with the networking gateway via the unique network identifier ID, and to join a network created by the networking gateway via the communication link.

In a seventh aspect, the present disclosure provides a cloud server, including a processor and a memory configured to store software modules executable by the processor. The processor is configured to run a program corresponding to the software module by reading the software modules stored in the memory. The software modules include:

a fourth receiving module, configured to receive relevant network access information of a smart device to access a network;

a fourth sending module, configured to send a network access request carrying the relevant network access information to a networking gateway;

a fifth receiving module, configured to receive a unique network identifier ID from the networking gateway; and a fifth sending module, configured to send the unique network identifier ID to the smart device through a mobile terminal to enable the smart device waiting to access a network to establish a communication link with the networking gateway, and to join a network created by the networking gateway via the communication link.

In an eighth aspect, the present disclosure provides a networking gateway, including a processor and a memory configured to store software modules executable by the processor. The processor is configured to run a program corresponding to the software module by reading the software modules stored in the memory. The software modules include:

a first verifying module, configured to receive relevant network access information of a smart device to access a network, and verify the relevant network access information;

a sixth sending module, configured to, when verification of the first verifying module is passed, send a unique network identifier ID to the smart device via a cloud server and a mobile terminal, to enable the smart device to establish a communication link with the networking gateway via the unique network identifier ID;

a second verifying module, configured to receive network access identity information from the smart device via the communication link, and to verify the network access identity information; and a second joining module, configured to add the smart device to a network created by the networking gateway when verification of the second verification module is passed.

In a ninth aspect, the present disclosure provides a network access system. The system includes a smart device to access a network, a mobile terminal, a cloud server and a networking gateway.

The smart device is configured to send relevant network access information to the mobile terminal, to establish a communication link with the networking gateway via a unique network identifier ID after receiving the unique network identifier ID from the networking gateway, and to send network access identity information to the networking gateway via the communication link.

The mobile terminal is configured to upload a device addition command carrying the relevant network access information to the cloud server after receiving the relevant network access information of the smart device, and to send the unique network identifier ID to the smart device after receiving the unique network identifier ID from the cloud server.

The cloud server is configured to send a network access request carrying the relevant network access information to the networking gateway after receiving the relevant network access information of the smart device, receive the unique network identifier ID from the networking gateway, and to send the unique network identifier ID to the mobile terminal.

The networking gateway is configured to verify the relevant network access information according to a preset rule after receiving the relevant network access information of the smart device and to send the unique network identifier ID to the cloud server and when the verification is passed, and to verify the network access identity information after receiving the network access identity information from the smart device via the communication link and to add the smart device to a network created by the networking gateway when the verification is passed.

The above description is only an overview of technical solutions of the present disclosure. In order to understand technical means of the present disclosure more clearly, the technical means may be implemented according to contents of the specification. In addition, in order to make the foregoing and other objectives, features and advantages of the present disclosure more apparent and easily to be understood, specific embodiments of the present disclosure are illustrated as follows.

BRIEF DESCRIPTION OF THE DRAWINGS

By reading detailed description of preferred embodiments hereinafter, other advantages and benefits will become apparent to those skilled in the art. The drawings are merely used to illustrate the preferred embodiments, and cannot be construed as limiting the present disclosure. In addition, the same reference numerals throughout the drawings represent the same elements.

DETAILED DESCRIPTION

Hereinafter, exemplary embodiments of the present disclosure will be described in a more detailed manner with reference to the drawings. Although the exemplary embodiments of the present disclosure are illustrated in the drawings, it should be understood that the present disclosure may be implemented in various manners and should not be limited by the embodiments specified herein. On the contrary, the embodiments provided herein aim at explaining the present disclosure more explicitly, and fully conveying the scope of the present disclosure to those skilled in the art.

Figure 1:
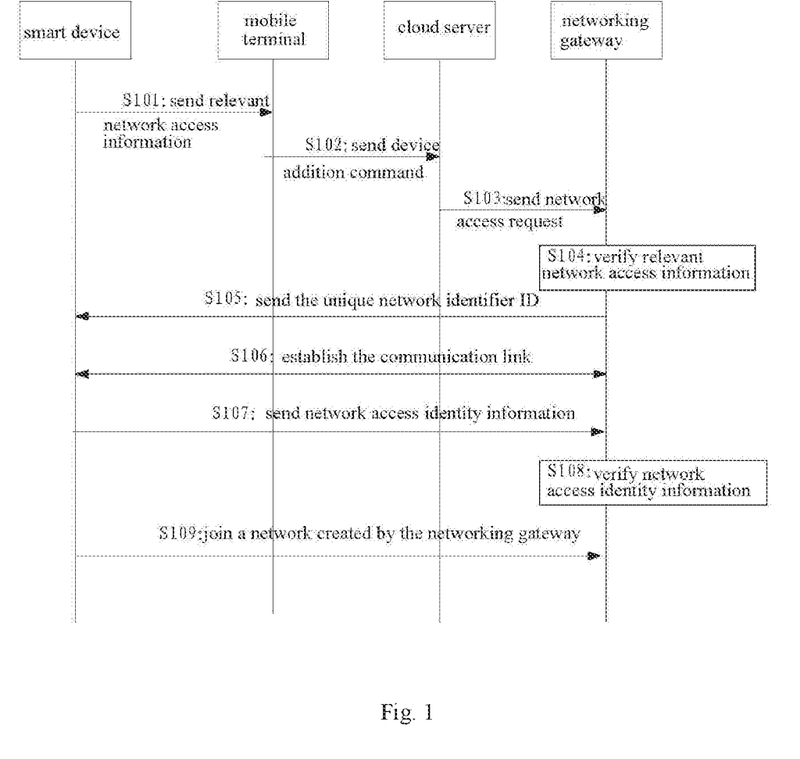
FIG. 1 is a schematic diagram illustrating signaling interaction of a network access method provided by the present disclosure.

The present disclosure provides a network access method. FIG. 1 is a schematic diagram illustrating signaling interaction of a network access method according to an embodiment of the present disclosure. The method specifically includes the followings.

At block S101, a smart device to access a network sends relevant network access information to a mobile terminal.

The relevant network access information includes necessary information such as an ID of the smart device, a key and network access information entered by the manufacturer before leaving the factory, and key data set by a user, and the like.

At block S102, the mobile terminal uploads a device addition command carrying the relevant network access information to a cloud server.

The device addition command is configured to command the cloud server to request a networking gateway to add the smart device. The device addition command carries the relevant network access information of the smart device.

At block S103, the cloud server sends a network access request carrying the relevant network access information to the networking gateway.

The network access request is configured to request the networking gateway to permit the smart device to access a network, that is, to request the networking gateway to add the smart device to a network created by the networking gateway.

At block S104, the networking gateway verifies the relevant network access information according to a preset rule.

In one implementation, standard information of the smart device is stored in the networking gateway. Upon receiving the relevant network access information, the networking gateway compares the relevant network access information with the standard information. When the relevant network access information is within the range of the standard information, it is considered that the verification is passed.

In another implementation, the networking gateway compares the relevant network access information with the key information preset by the user. When the relevant network access information is consistent with the key information, it is considered that the verification is passed.

The above description simply illustrates two examples. No limitation is made to the preset rule herein. The preset rule may be standard information set uniformly, or may be added and matched by the user, or may be chosen from several preset rules set uniformly.

At block S105, when the verification is passed, the networking gateway sends a unique network identifier ID to the smart device via the cloud server and the mobile terminal.

The unique network identifier ID is configured to identify the network created by the networking gateway uniquely. The smart device may access to the network corresponding to the unique network identifier ID by using the unique network identifier ID.

At block S106, the smart device establishes a communication link with the networking gateway via the unique network identifier ID.

The smart device may directly establish the communication link with the networking gateway via the unique network identifier ID after receiving the unique network identifier ID. With the communication link, the smart device may communicate with the networking gateway.

At block S107, the smart device sends network access identity information to the networking gateway via the communication link.

The network access identity information includes identity identifier of the smart device, for example, the ID of the smart device.

At block S108, the networking gateway verifies the network access identity information.

In actual applications, the smart device sends its network access identity information to the networking gateway via the communication link after establishing the communication link with the networking gateway, so that the networking gateway verifies the network access identity information.

In one implementation, the networking gateway is pre-stored with network access identity information of smart terminals that are allowed to access the network. Upon receiving any network access identity information, the networking gateway matches the network access identity information with pre-stored network access identity information. When the matching is successful, it indicates that the verification is passed.

At block S109, when the verification is passed, the smart device joins the network created by the networking gateway.

In actual applications, after the verification of the network access identity information is passed, the networking gateway returns a verification success notification to the smart device sending the network access identity information. The smart device joins the network created by the networking gateway after receiving the notification, and thus the network access process is completed.

In the method according to this embodiment of the present application, the smart device obtains the unique network identifier ID of the networking gateway via the mobile terminal and the cloud server, establishes the communication link with the networking gateway via the unique network identifier ID, and accomplishes the network access operation on the basis of the communication link. Consequently, the smart device according to this embodiment of the present application may access a network quickly and easily, and no interference arises when a plurality of devices accesses the network simultaneously.

Figure 2:
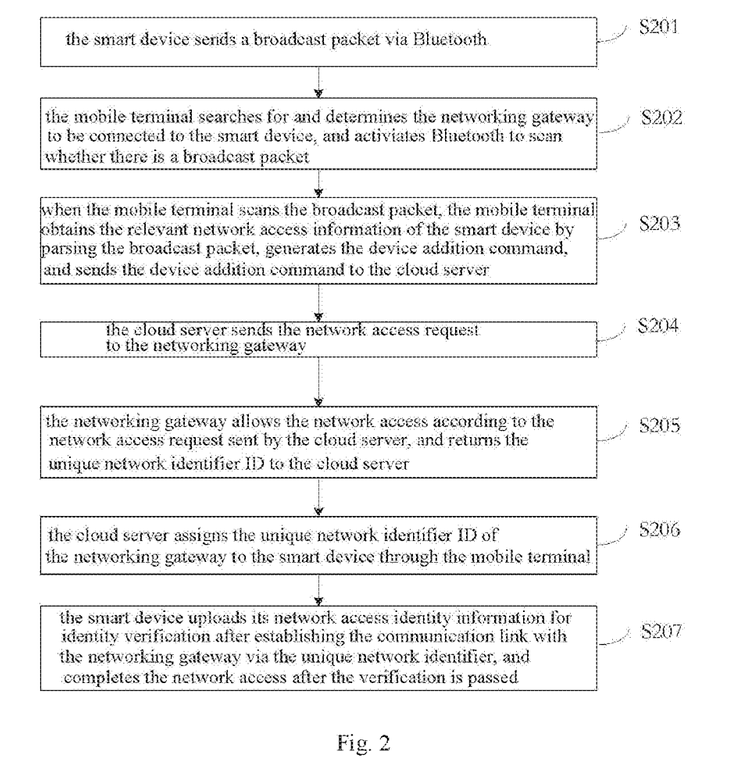
FIG. 2 is a flow chart of a fast network access method for an ultra-low-power-consumption smart device provided by the present disclosure.

Hereinafter, a specific implementation scenario is illustrated. Referring to FIG. 2, which is a flow chart of a fast network access method for an ultra-low-power-consumption smart device according to this embodiment of the present disclosure, the method includes the followings.

At block S201, the smart device sends a broadcast packet via Bluetooth.

The smart device may be any smart device to be added to a smart home network system. For example, the smart device may be a smart television, a smart lamp, a smart electric cooker and a robot cleaner, and the like.

In actual applications, the smart device activates a Bluetooth module upon entering a configuration mode, and sends the broadcast packet via Bluetooth. The broadcast packet is a packet carrying the relevant network access information of the smart device to access a network, and is used to report the relevant network access information. Information carried by the broadcast packet includes, but is not limited to, necessary information such as an ID of the smart device, a key and network access information entered by the manufacturer before leaving the factory, and key data set by a user.

In an implementation, before sending the broadcast packet via the Bluetooth, the smart device activates the configuration mode and turns on a communication function of the Bluetooth module of the smart device, such that the smart device performs the Bluetooth connection under the configuration mode.

At block S202, the mobile terminal performs search and determines the networking gateway to be connected with the smart device, and activates the Bluetooth to scan whether there is a broadcast packet.

The mobile terminal may be, for example, a mobile phone, an IPAD, a laptop, a smart watch, a smart bracelet, etc., having a human machine interface for realizing interactions with the user and having functions like providing state information of a new device to the user.

In actual applications, when the smart device needs to be added to the smart home network system, the mobile terminal activates the Bluetooth for a scan, so as to find and determine the networking gateway to be connected to the smart device.

Specifically, the mobile terminal may be set to enter a new device addition mode, under which mode the networking gateway to be connected to the smart device is searched for and determined. The Bluetooth function of the mobile terminal is activated to scan and search for the broadcast packet.

For example, in a case where the mobile terminal is a smart phone, the mobile phone APP enters into the new device addition mode, the networking gateway to be connected to the smart device is chosen, and the smart phone enters a scan state as a Bluetooth master device. When the Bluetooth master device scans the broadcast packet sent by the smart device, the Bluetooth master device obtains the relevant network access information by parsing the broadcast packet. In addition, the mobile phone APP sends the device addition command carrying the relevant network access information to the cloud server.

At block S203, when the mobile terminal scans the broadcast packet, the mobile terminal obtains the relevant network access information of the smart device by parsing the broadcast packet, generates the device addition command and sends the device addition command to the cloud server.

When the mobile terminal scans the broadcast packet sent by the smart device via the Bluetooth, the mobile terminal is connected to the smart device via the Bluetooth, obtains the relevant network access information of the smart device by parsing the broadcast packet, generates the device addition command according to the relevant network access information of the smart device, and sends the device addition command to the cloud server.

At block S204, the cloud server sends the network access request to the networking gateway.

When the cloud server receives the device addition command, the cloud server generates the network access request according to the relevant network access information carried by the device addition command, and sends the network access request to the networking gateway. The networking gateway determines whether to allow a network access according to the network access request, and returns the unique network identifier ID to the cloud server when determining allowing the network access.

At block S205, the networking gateway allows the network access according to the network access request sent by the cloud server, and returns the unique network identifier ID to the cloud server.

The networking gateway returns the unique network identifier ID to the cloud server after determining allowing the network access. The result of whether the networking gateway allows the smart device to access the network may be provided to the user through the APP on the mobile terminal.

At block S206, the cloud server assigns the unique network identifier ID of the networking gateway to the smart device through the mobile terminal.

In an implementation, the cloud server assigns the unique network identifier ID of the networking gateway to the smart device in an encrypted manner by using the Bluetooth function of the mobile terminal.

At block S207, the smart device uploads its own network access identity information for identity verification after establishing the communication link with the networking gateway via the unique network identifier ID of the networking gateway, and completes the network access when the identity verification is passed.

When the identity verification is passed, the smart device is added to the network created by the networking gateway.

When the identity verification is failed, the smart device stops the network access operation.

In an embodiment, after the cloud server assigns the unique network identifier ID of the networking gateway to the smart device through the mobile terminal, the smart device turns off the Bluetooth module, stops Bluetooth broadcasting and disconnects the Bluetooth connection with the mobile terminal.

Compared with conventional method 1 and method 2, the network access method for an ultra-low-power-consumption smart device provided by the present disclosure has the following advantages. First, the interference arisen when a plurality of devices nearby accesses a network simultaneously can be avoided, so that a plurality of new devices is allowed to access the network without affecting each other. Second, there is no need to search for the networking gateway, and thus the network access time is short. Third, the smart device may realize real-time and online communication.

It should be noted that, the networking gateway may be separate from the cloud server, or may be in the cloud server. In other words, the mobile terminal may upload the device addition command to the cloud server, the cloud server may directly verify the relevant network access information through the networking gateway therein, and send the unique network identifier ID to the smart device via the mobile terminal.

Figure 3:
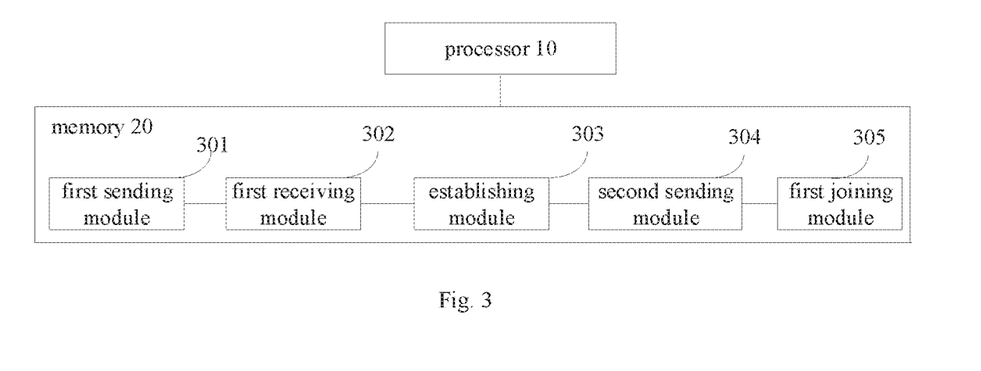
FIG. 3 is a block diagram of a smart device provided by the present disclosure.

Corresponding to the above method embodiments, this embodiment of the present disclosure further provides a smart device. FIG. 3 is a block diagram of a smart device according to an embodiment of the present disclosure. The smart device includes a processor 10 and a memory 20. The memory 20 is configured to store software modules executable by the processor 10. The processor 10 is configured to run a program corresponding to the software modules by reading the software modules stored in the memory 200. The software modules include a first sending module 301, a first receiving module 302, an establishing module 303, a second sending module 304 and a first joining module 305.

The first sending module 301 is configured to send relevant network access information to the mobile terminal. The relevant network access information is uploaded to the cloud server by the mobile terminal.

The first receiving module 302 is configured to receive the unique network identifier ID from the mobile terminal, wherein the unique network identifier ID is acquired by the cloud server from the networking gateway and transferred from the cloud server to the mobile terminal after the cloud server sends the relevant network access information to the networking gateway.

The establishing module 303 is configured to establish the communication link with the networking gateway via the unique network identifier ID.

The second sending module 304 is configured to send network access identity information to the networking gateway via the communication link.

The first joining module 305 is configured to join the network created by the networking gateway after the network access identity information passes verification of the networking gateway.

The first sending module is specifically configured to send the broadcast packet carrying the relevant network access information via Bluetooth, to enable the mobile terminal to obtain the relevant network access information in the broadcast packet after scanning the broadcast packet via the Bluetooth.

The smart device further includes a stopping module. The stopping module is configured to stop joining the network created by the networking gateway when the network access identity information fails to pass the verification of the networking gateway.

Figure 4:
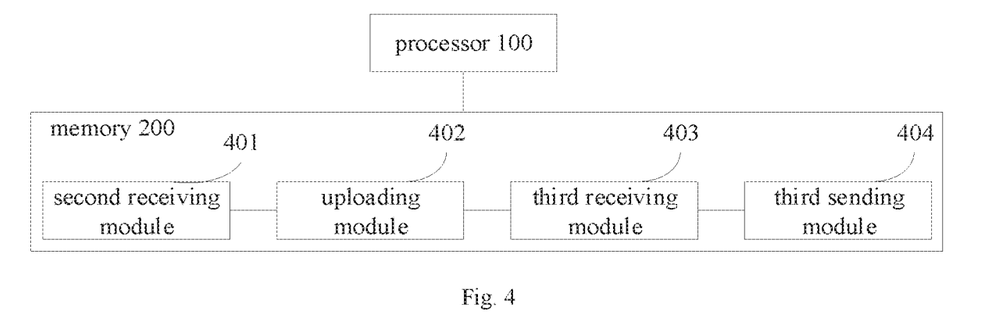
FIG. 4 is a block diagram of a mobile terminal provided by the present disclosure.

Embodiments of the present disclosure further provides a mobile terminal. FIG. 4 is a block diagram of a mobile terminal according to an embodiment of the present disclosure. The mobile terminal includes a processor 100 and a memory 200. The memory 200 is configured to store software modules executable by the processor 100. The processor 100 is configured to run a program corresponding to the software modules by reading the software modules stored in the memory 200. The software modules include: a second receiving module 401, an uploading module 402, a third receiving module 403 and a third sending module 404.

The second receiving module 401 is configured to receive the relevant network access information from a smart device.

The uploading module 402 is configured to upload the device addition command carrying the relevant network access information to the cloud server, to enable the cloud server to obtain the unique network identifier ID from the networking gateway.

The third receiving module 403 is configured to receive the unique network identifier ID from the cloud server.

The third sending module 404 is configured to send the unique network identifier ID to the smart device, to enable the smart device to establish the communication link with the networking gateway via the unique network identifier ID and to join the network created by the networking gateway via the communication link.

The second receiving module is specifically configured to obtain the relevant network access information in the broadcast packet after scanning the broadcast packet via Bluetooth, wherein the broadcast packet is sent by the smart device via the Bluetooth.

The third sending module is specifically configured to encrypt the unique network identifier ID and send the encrypted unique network identifier ID to the smart device.

Figure 5:
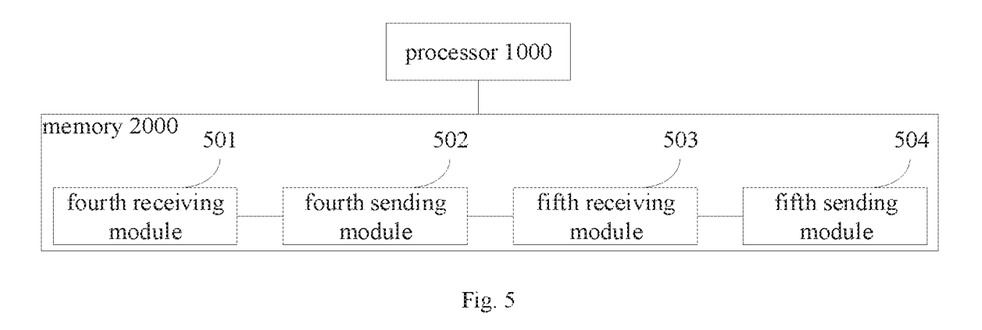
FIG. 5 is a block diagram of a cloud server provided by the present disclosure.

Embodiments of the present disclosure further provide a cloud server. FIG. 5 is a block diagram of a cloud server according to an embodiment of the present disclosure. The cloud server includes a processor 1000 and a memory 2000. The memory 2000 is configured to store software modules executable by the processor 1000. The processor 1000 is configured to run a program corresponding to the software modules by reading the software modules stored in the memory 2000. The software modules include: a fourth receiving module 501, a fourth sending module 502, a fifth receiving module 503 and a fifth sending module 504.

The fourth receiving module 501 is configured to receive the relevant network access information of the smart device to access a network.

The fourth sending module 502 is configured to send the network access request carrying the relevant network access information to the networking gateway.

The fifth receiving module 503 is configured to receive the unique network identifier ID from the networking gateway.

The fifth sending module 504 is configured to send the unique network identifier ID to the smart device through the mobile terminal, to enable the smart device to establish the communication link with the networking gateway and to join the network created by the networking gateway via the communication link.

Figure 6:
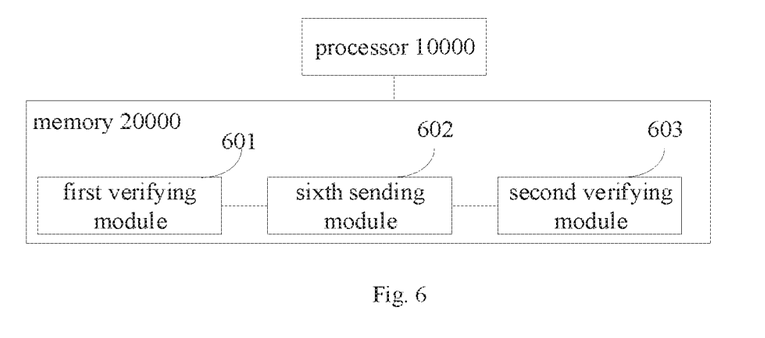
FIG. 6 is a block diagram of a networking gateway provided by the present disclosure.

Embodiments of the present disclosure further provide a networking gateway. FIG. 6 is a block diagram of a networking gateway according to an embodiment of the present disclosure. The networking gateway includes a processor 10000 and a memory 20000. The memory 20000 is configured to store software modules executable by the processor 10000. The processor 10000 is configured to run a program corresponding to the software modules by reading the software modules stored in the memory 20000. The software modules include: a first verifying module 601, a sixth sending module 602, a second verifying module 603 and a second joining module 604.

The first verifying module 601 is configured to verify relevant network access information according to a preset rule after receiving the relevant network access information of the smart device to access a network.

The sixth sending module 602 is configured to, when the verification of the first verifying module is passed, send the unique network identifier ID to the smart device via the cloud server and the mobile terminal, to enable the smart device to establish the communication link with the networking gateway via the unique network identifier ID.

The second verifying module 603 is configured to verify the network access identity information after receiving the network access identity information from the smart device via the communication link.

The second joining module 604 is configured to, when the verification of the second verification module is passed, add the smart device to the network created by the networking gateway.

Figure 7:
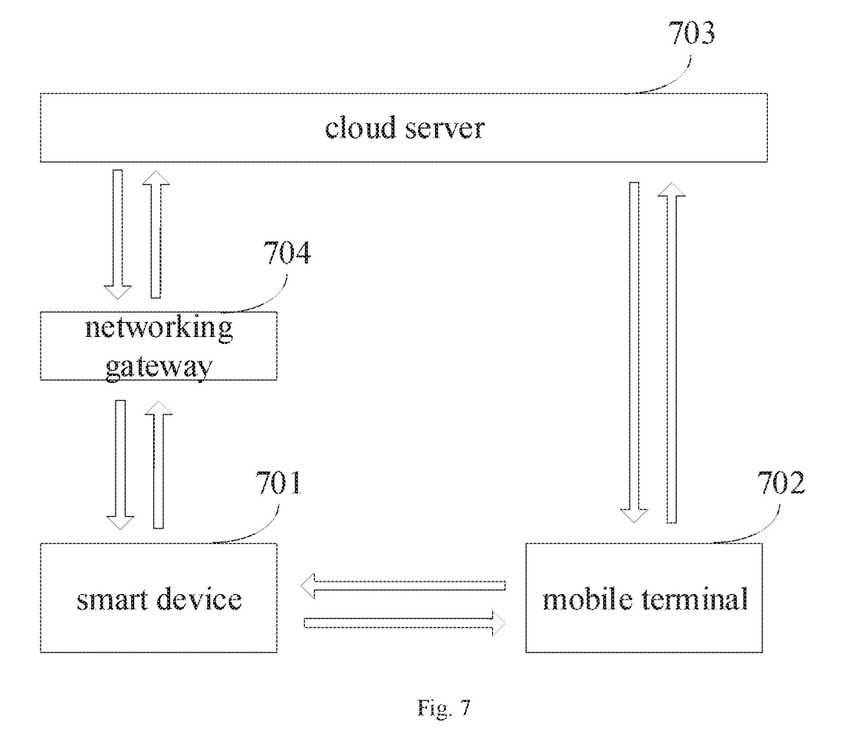
FIG. 7 is a block diagram of a network access system provided by the present disclosure.

Corresponding to the above method embodiments, embodiments of the present disclosure further provides a network access system. FIG. 7 is a block diagram of a network access system according to an embodiment of the present disclosure. The system includes a smart device 701 to access a network, a mobile terminal 702, a cloud server 703 and a networking gateway 704.

The smart device 701 is configured to send the relevant network access information to the mobile terminal, to establish the communication link with the networking gateway via the unique network identifier ID after receiving the unique network identifier 113 of the networking gateway, and to send the network access identity information to the networking gateway via the communication link.

The mobile terminal 702 is configured to upload the device addition command carrying the relevant network access information to the cloud server after receiving the relevant network access information of the smart device, and to send the unique network identifier ID to the smart, device after receiving the unique network identifier ID from the cloud server.

The cloud server 703 is configured to send the network access request carrying the relevant network access information to the networking gateway after receiving the relevant network access information of the smart device, to receive the unique network identifier ID from the networking gateway, and to send the unique network identifier ID to the mobile terminal.

The networking gateway 704 is configured to verify the relevant network access information according to a preset rule after receiving the relevant network access information of the smart device, and when the verification is passed, to send the unique network identifier ID to the cloud server; and to verify the network access identity information after receiving the network access identity information from the smart device via the communication link, and when the verification is passed, to add the smart device to a network created by the networking gateway.

In above embodiments of the present disclosure, descriptions of respective embodiments are emphasized differently, and for parts that are not detailed in some embodiments, reference may be made to relevant descriptions of other embodiments.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples may be combined by those skilled in the art.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, a plurality of means two or more than two, unless specified otherwise.

The flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function unit of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. The foregoing embodiments are merely preferred embodiments of the present disclosure. It should be noted that, for those skilled in the technical field, without departing from the principle of the present disclosure, various changes and improvements may be made, which are covered by the protection scope of the present disclosure.

What is claimed is:

1. A network access method, applied to a smart device to access a network, comprising:
sending relevant network access information to a mobile terminal, wherein the relevant network access information is uploaded to a cloud server by the mobile terminal;
receiving a unique network identifier ID from the mobile terminal, and establishing a communication link with a networking gateway via the unique network identifier ID, wherein the unique network identifier ID is acquired by the cloud server from the networking gateway after the networking gateway verifies the relevant network access information according to a preset rule and transferred from the cloud server to the mobile terminal after the cloud server sends the relevant network access information to the networking gateway and the relevant network access information passes verification of the networking gateway; and
sending network access identity information to the networking gateway via the communication link, and joining a network created by the networking gateway after the network access identity information passes verification of the networking gateway.

2. The method according to claim 1, wherein sending relevant network access information to the mobile terminal comprises:
sending a broadcast packet carrying the relevant network access information via Bluetooth, to enable the mobile terminal to obtain the relevant network access information in the broadcast packet after the mobile terminal scans the broadcast packet via Bluetooth.

3. The method according to claim 1, further comprising:
when the network access identity information fails to pass the verification of the networking gateway, stopping joining the network created by the networking gateway.

4. The method according to claim 1, wherein the networking gateway is integrated in the cloud server, or separate from the cloud server.

5. A smart device, comprising:
a processor;
a memory, configured to store software modules executable by the processor, wherein the processor is configured to run a program corresponding to the software modules by reading the software modules stored in the memory, the software modules comprising:
a first sending module, configured to send relevant network access information to a mobile terminal, wherein the relevant network access information is uploaded by the mobile terminal to a cloud server;
a first receiving module, configured to receive a unique network identifier ID from the mobile terminal, wherein the unique network identifier ID is acquired by the cloud server from a networking gateway after the networking gateway verifies the relevant network access information according to a preset rule and transferred from the cloud server to the mobile terminal after the cloud server sends the relevant network access information to the networking gateway and the relevant network access information passes verification of the networking gateway; and
an establishing module, configured to establish a communication link with the networking gateway via the unique network identifier ID;
a second sending module, configured to send network access identity information to the networking gateway via the communication link; and
a first joining module, configured to join a network created by the networking gateway after the network access identity information passes verification of the networking gateway.

6. The smart device according to claim 5, wherein the first sending module is configured to:
send a broadcast packet carrying the relevant network access information via Bluetooth, to enable the mobile terminal to obtain the relevant network access information in the broadcast packet after scanning the broadcast packet via Bluetooth.

7. The smart device according to claim 5, wherein the software modules further comprise:
a stopping module, configured to stop joining the network created by the networking gateway when the network access identity information fails to pass verification of the networking gateway.

8. A mobile terminal, comprising:
a processor;
a memory, configured to store software modules executable by the processor, wherein the processor is configured to run a program corresponding to the software modules by reading the software modules stored in the memory, the software modules comprising:
a second receiving module, configured to receive relevant network access information from a smart device to access a network;
an uploading module, configured to upload a device addition command carrying the relevant network access information to a cloud server, to enable the cloud server to obtain a unique network identifier ID from a networking gateway after the networking gateway verifies the relevant network access information according to a preset rule and the relevant network access information passes verification of the networking gateway;
a third receiving module, configured to receive the unique network identifier ID from the cloud server; and
a third sending module, configured to send the unique network identifier ID to the smart device, to enable the smart device to establish a communication link with the networking gateway via the unique network identifier ID, and to join a network created by the networking gateway via the communication link after network access identity information sent from the smart device to the network gateway passes verification of the networking gateway.

9. The mobile terminal according to claim 8, wherein the second receiving module is configured to:
obtain the relevant network access information in a broadcast packet after scanning the broadcast packet via Bluetooth, wherein the broadcast packet is sent by the smart device via Bluetooth.

10. The mobile terminal according to claim 8, wherein the third sending module is configured to:

encrypt the unique network identifier ID and send the encrypted unique network identifier ID to the smart device.

* * * * *